United States Patent [19]

Gearey

[11] Patent Number: 4,916,431
[45] Date of Patent: Apr. 10, 1990

[54] EARLY WARNING INDICATOR FOR A BRAKING SYSTEM

[76] Inventor: John Gearey, P.O. Box 2036, Oregon Institute of Technology, Klamath Falls, Oreg. 97601

[21] Appl. No.: 384,040

[22] Filed: Jul. 24, 1989

Related U.S. Application Data

[63] Continuation of Ser. No. 150,160, Jan. 29, 1988, abandoned.

[51] Int. Cl.⁴ .......................... B60Q 1/44; H01H 3/14
[52] U.S. Cl. ..................... 340/479; 340/459; 340/464; 340/467; 340/463; 200/61.89; 200/86.5
[58] Field of Search ............... 340/459, 479, 468, 464, 340/463, 467, 665, 666; 200/61.89, 86.5

[56] References Cited

U.S. PATENT DOCUMENTS

| | | | |
|---|---|---|---|
| 2,486,864 | 11/1949 | Mitchell | 340/66 |
| 2,674,669 | 4/1954 | Leedam | 200/86.5 |
| 2,764,962 | 10/1956 | Warren et al. | 340/66 |
| 2,957,161 | 10/1960 | Daws | 340/66 |
| 3,109,158 | 10/1963 | Coombs | 340/66 |
| 3,320,586 | 5/1967 | Wagner | 340/66 |
| 3,395,388 | 7/1968 | Hendrickson | 200/86.5 |
| 3,431,556 | 3/1969 | Johnson | 340/72 |
| 3,478,312 | 11/1969 | Lee | 340/72 |
| 3,492,638 | 1/1970 | Lane | 340/66 |
| 3,501,742 | 3/1970 | Ellison | 340/71 |
| 3,576,568 | 4/1971 | Thirion | 340/66 |
| 3,631,390 | 12/1971 | Murphy | 340/66 |
| 3,638,181 | 1/1972 | Bryant | 340/66 |
| 3,676,844 | 7/1972 | Hendrickson | 340/66 |
| 3,702,459 | 11/1972 | Bauchan | 340/66 |
| 3,708,782 | 1/1973 | Mori | 340/66 |
| 3,711,828 | 1/1973 | Hawkins | 340/66 |
| 3,787,808 | 1/1974 | Knopf | 340/66 |
| 3,806,870 | 4/1974 | Kalajian | 340/66 |
| 3,821,701 | 6/1970 | Ross | 340/71 |
| 3,911,394 | 10/1975 | Shames | 340/71 |
| 3,949,361 | 4/1976 | Replogle | 340/66 |
| 4,107,647 | 8/1978 | Yoshino | 340/66 |
| 4,149,141 | 4/1979 | Tanimura | 340/66 |
| 4,224,598 | 9/1980 | Ostrowski | 340/66 |
| 4,231,013 | 10/1980 | Freemax et al. | 340/66 |
| 4,258,353 | 3/1981 | Carlson | 340/66 |
| 4,272,800 | 6/1981 | Asatourian | 340/66 |
| 4,280,116 | 7/1981 | Camp | 340/66 |
| 4,357,594 | 11/1982 | Ehrlich et al. | 340/66 |
| 4,404,439 | 9/1983 | Leighton | 200/86.5 |
| 4,470,036 | 9/1984 | Doerr et al. | 340/66 |
| 4,730,181 | 3/1988 | Perkins | 340/71 |

FOREIGN PATENT DOCUMENTS 1475290 6/1977 United Kingdom ............... 340/134

*Primary Examiner*—Donnie L. Crosland
*Attorney, Agent, or Firm*—Steven F. Caserza

[57] ABSTRACT

A vehicular early warning system includes one or more of the following modules: An accelerator pedal pressure sensor for providing an early warning braking signal. If desired, this element also functions as a backup brake light system totally independent of the standard brake lights. A deceleration sensor which reads either intake manifold vacuum or accelerator linkage postion. This sensor lights an amber lamp providing a deceleration warning signal. A brake pedal pressure sensor system including two sensors. The first serves as the standard brake sensor. The second sensor signals high brake pressure, indicating heavy braking. A low velocity speedometer sensor, which automatically triggers a warning light as a vehicle comes to a stop.

6 Claims, 12 Drawing Sheets

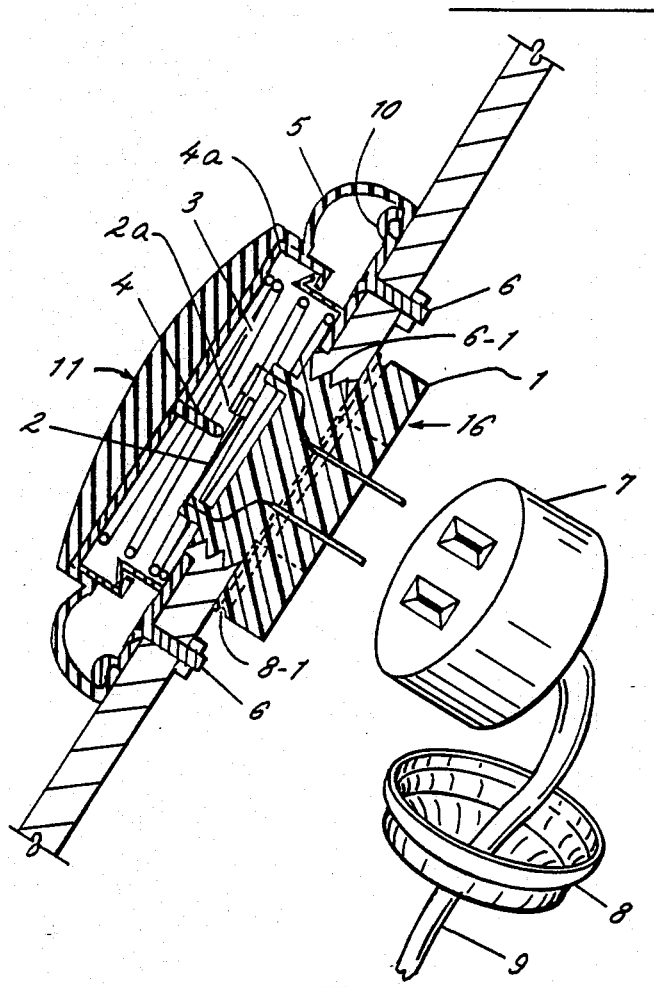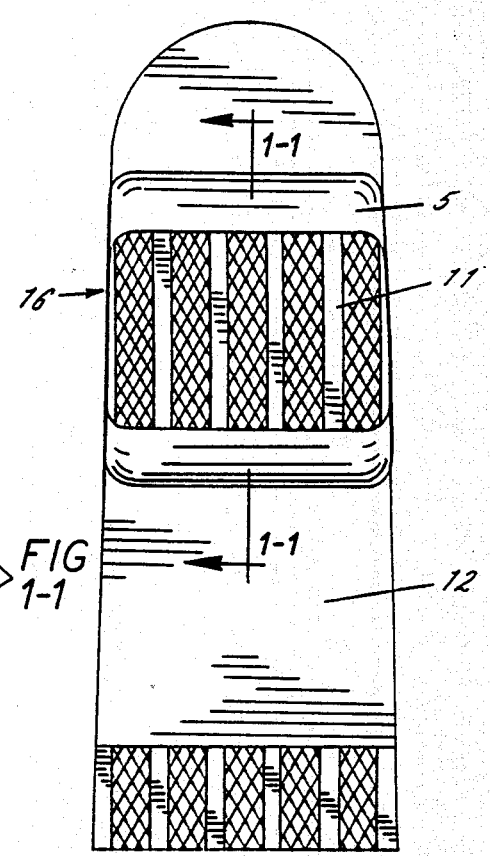
FIG.1-2
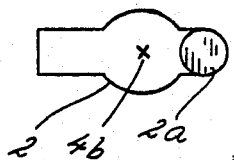
FIG. 1-3
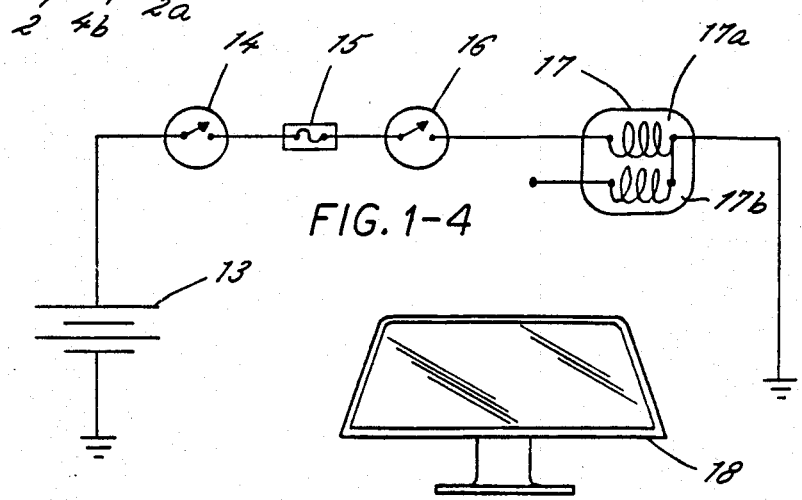
FIG.1-4
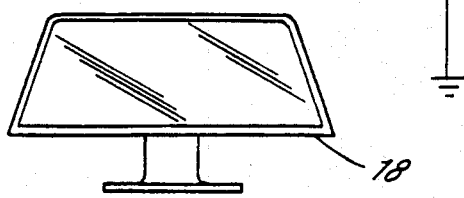
FIG.1-5

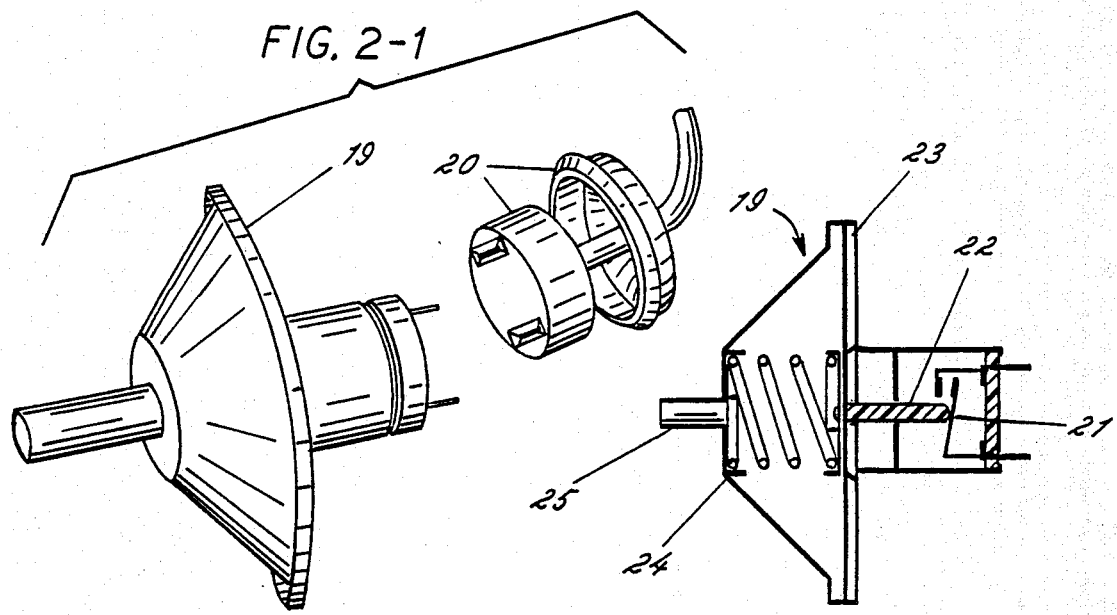
FIG. 2-1
FIG. 2-2
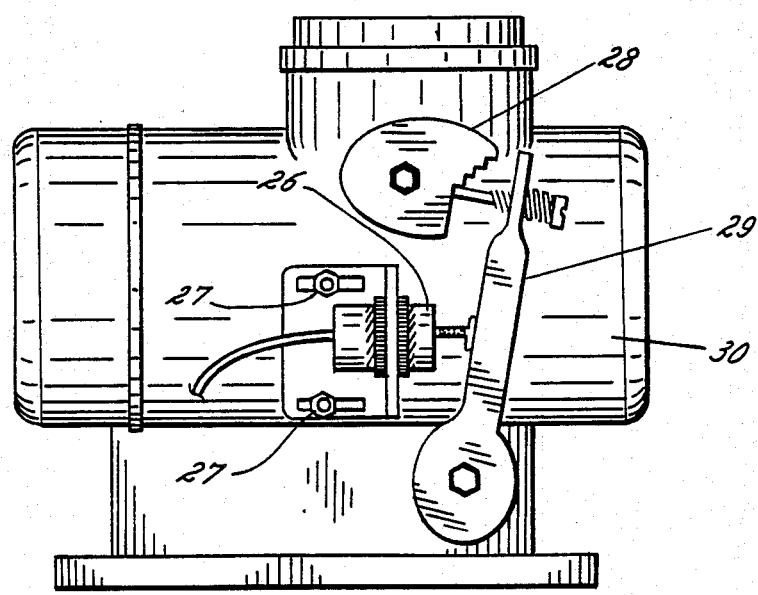
FIG. 2-3

EARLY WARNING INDICATOR FOR A BRAKING SYSTEM

This is a continuation of application Ser. No. 150,160, filed Jan. 29, 1988, now abandoned.

BACKGROUND

This invention relates to motor vehicle safety systems, and is designed to provide an early warning of deceleration and braking in order to reduce rear end collisions.

The prior art is dominated by the use of two condition switches gauging accelerator position. Many of these switches are mechanically attached to the accelerator pedal. Possible pedal jamming and the dubious value of lighting a green light on the rear end of a car makes most of these systems unsafe (restarting a stalled car in traffic would display a green light). Many prior art systems are wired into the standard brake lights in one way or another, an obvious mistake since a short circuit would disable the brake lights.

U.S. Pat. 3,708,782 issued to Mori uses a complex decision circuit to gauge the speed at which the brake pedal is depressed. Mori's system is wired into the stock brake lights which introduces unreliability. Also this design fails to give a signal warning in a developing emergency. Often, upon seeing trouble ahead, a driver will drag his brakes in anticipation of heavy braking. Within microseconds, Mori's RC time constant decision circuit disables any emergency signal warning.

SUMMARY

An early warning system constructed in accordance with this invention includes one or more of the following modules:

1. An accelerator pedal pressure sensor providing a visible signal which warns following vehicles of braking. This element also functions as a redundant brake light system totally independent of the standard brake lights.

2. A deceleration sensor which reads, for example, either intake manifold vacuum or accelerator linkage position. This sensor lights an amber lamp providing a deceleration warning signal.

3. A brake pedal pressure sensor system including two sensors. The first sensor serves as the standard brake sensor. The second sensor signals high brake pressure, indicating heavy braking.

4. A low velocity speedometer sensor, which automatically triggers a warning light as a vehicle comes to a stop.

The object of this invention is to reduce rear-end collisions, while requiring no voluntary compliance by the motor vehicle operators, and without presenting any annoyance that may induce the owner/operator to disable it.

The accelerator pedal pressure switch of Module 1 accomplishes this by lighting a third brake light at the instant the motor vehicle operator removes his foot from the accelerator pedal. This allows a savings of approximately 0.2 seconds to 0.3 seconds of reaction time by the driver of a vehicle which is following the braking vehicle. At 60 mph this translates into approximately 18 to 26 foot reduction in total stopping distance. Also, the delay time between the illumination of the third brake light and the standard brake lights gives the following driver an indication of the urgency of the braking situation (i.e., the less the delay the more urgent the situation).

The wide use of early warning lights of this invention would eliminate some and reduce the severity of most chain reaction type rear-end collisions. For example, using 0.25 seconds of reaction time savings per vehicle, it can be seen that by the time four vehicles in a chain react to a braking emergency, one full second of reaction time is gained and passed on to following drivers.

The deceleration warning system of Module 2 includes a new and unique dual color, dual lamp, third brake light, which provides a constant red signal when triggered by the accelerator pedal switch of Module 1 and an amber signal when triggered by an accelerator linkage sensor which gauges throttle position. At the first sign of trouble a prudent driver immediately backs off the throttle. The deceleration indicator reduces the reaction time of the following driver by alerting the following driver to the changing status of the lead vehicle.

Module 3 provides two unique advancements in motor vehicle safety. First, a low pressure brake sensor is located in the rubber skid pad of a vehicle's brake pedal. Secondly, a high pressure brake sensor is also located in the rubber skid pad of the brake pedal, for example, sandwiched on top of the low pressure sensor. Both these sensors have no moving parts to wear out and never need adjustment. Furthermore, this design can also be configured to provide a variable brake pressure indication.

The low pressure sensor replaces a vehicle's standard brake pressure sensor, eliminating adjustment problems associated with brake pedal shaft plunger switch sensors and brake fluid leakage problems associated with hydraulic pressure sensors. While brake failure due to a leaking hydraulic brake sensor is uncommon, it does occur and it does cause accidents. Module 3 offers a safer and more dependable solution to the stock brake light switch problem.

The high brake pressure sensor represents a major advance in motor vehicle safety. When hard foot pressure is applied to the brake pedal, the high pressure sensor located in the pedal skid pad, triggers a bright dual filament red constant signal lamp. Presently drivers are given no indication of the magnitude of a braking situation. Motor vehicle operators must rely on their own senses and mental processes to react rapidly to an emergency. The heavy braking indication, provided by this brake pedal skid pad sensor, reduces the reaction time necessary for a following driver to take appropriate evasive action in an emergency.

Law enforcement can also be enhanced by using the high brake pedal pressure indicator as a means of spotting vehicles on the road operating with faulty brakes, such as a power brake equipped vehicle operating with a failed power assist unit, thus requiring great foot pressure to accomplish normal braking.

The signal pattern provided by Module 3 allows the stock brake lights to be displayed for any length of time preceding the initiation of heavy braking. In all cases, the moment hard brake pressure is applied, an additional red signal warning of heavy braking is displayed. In one embodiment, a set of medium pressure contacts is added to provide a variable brake pressure sensor without opening the hydraulic system.

Module 4 provides a speedometer cable drag switch which automatically triggers a flashing red light to indicate that a vehicle is stopped. As a vehicle comes to a halt, this sensor flashes a single filament of the dual filament high brake pressure lamp contained in Module 3. This protects stalled vehicles immediately without the delay time necessary for the driver to activate the standard emergency flasher. Also, in normal stop and go driving much of the time a slowly creeping or stopped vehicle shows no lights. The automatic emergency flasher cures this safety hazard. Module 4 also provides a mechanical deceleration flasher driven off the speedometer cable.

The early warning system of this invention will save lives and reduce injuries due to rear-end collisions. Many horrendous multi-vehicle pile-ups, including head-on collisions, result from complications created initially by a minor rear-end collision. Even in cases where a rear-end collision does occur, by allowing the following driver additional time to slow down, the velocity of impact is reduced, thereby downgrading the severity of injuries sustained by the victims. Millions of dollars a year will be saved in property damage and medical cost.

The accelerator pedal pressure sensor offers a solution to a long standing problem. Reaction time has long been assumed to be unalterably dependent on driver reflexes and independent of vehicle design. Engineers and scientists for years have assumed the only possible reduction in total stopping distance was to reduce the manual stopping distance variable in the stopping distance equation, for example by improving brake and tire design. This invention approaches the problem from a different point of view, by reducing the other variable: reaction time. Mathematically we have

[(reaction time)×(rate)]+(manual stopping distance)=total stopping distance.

Reaction time can be further broken down:

reaction time=[(physical reaction time) +(mental reaction time)].

The early warning system of this invention virtually eliminates the physical reaction time component and simultaneously significantly reduces the mental reaction time component. Furthermore:' mental reaction time=(awareness time)+(decision time)

The early warning brake light of Module 1 redefines the moment reaction time is measured from, by eliminating physical reaction time. In a developing emergency, the amber deceleration light of Module 2 reduces awareness time. The delay time between the accelerator pedal brake light and the stock brake lights, or rather the lack of delay indicates to following drivers the lead driver's right foot travel time between accelerator and brake. Very little delay time indicates urgent foot travel thereby indicating an emergency response to trouble ahead which reduces the following driver's decision time. Finally, the heavy emergency braking indicator indicates to following drivers an instantly recognizable and unambiguous message of emergency trouble ahead. Decision time is significantly reduced, if not eliminated, in all cases. Perhaps the greatest contribution to safety is the contouring of dense high speed freeway traffic. The early third brake light rippling back through long lines of freeway traffic, preceding the stock brake lights, will save countless lives by allowing following drivers to slow sooner and more safely than is presently possible.

BRIEF DESCRIPTION OF THE DRAWINGS

FIG. 1—1 is a cutaway view of one embodiment of an accelerator pedal switch assembly constructed in accordance with this invention;

FIG. 1-2 is an illustration of a typical pedal application of the assemble of FIG. 1;

FIG. 1-3 is a top view of a pressure switch bridging contact;

FIG. 1-4 is a schematic diagram of one embodiment of Module 1 of this invention;

FIG. 1-5 is one embodiment of an early warning light constructed in accordance with this invention;

FIG. 2-1 is a pictorial illustration of a vacuum activated deceleration sensor;

FIG. 2—2 is a cut-away view of the vacuum activated deceleration sensor of FIG. 2-1;

FIG. 2-3 is a typical carburetor equipped with a plunger switch deceleration sensor;

FIG. 2-4 is a cut-away view of the plunger switch deceleration sensor of FIG. 2-3;

FIG. 2-5 is a dual lamp early warning light of one embodiment of this invention;

FIG. 2-6 is a dual lamp schematic diagram of one embodiment of this invention;

FIG. 3-1 is a cross-sectional view of a brake pedal showing low and high brake pressure sensors sandwiched together in the brake pedal's rubber skid pad;

FIG. 3-2 is an exploded view of the brake pedal high pressure sensor of FIG. 3-1;

FIG. 3—3 is a vertically sectioned view of the low pressure brake sensor of FIG. 3-1;

FIG. 3-4 is a rear view of the brake pedal and brake lever including a wiring route;

FIG. 3-5 is one embodiment of a three lamp early warning light;

FIG. 3-6 is a schematic diagram of one embodiment of a three lamp circuit.

FIG. 4-1 is a cross sectional view of one embodiment of a speedometer cable sensor with a directly driven deceleration flasher;

FIG. 4-2 is a top cutaway view of the mechanical drag switch shown in FIG. 4-1;

FIG. 4-3 is a front view of the directly driven deceleration flasher of FIG. 4-1;

FIG. 4—4 is cross sectional view of a speedometer cable sensor with a worm gear reduced deceleration flasher;

FIG. 4-5 is a schematic diagram of one embodiment of a deceleration flasher of this invention;

FIG. 4-6 is a side view of a floor board linkage accelerator pedal retrofit;

FIG. 4-7 is a side view of a fire wall mounted linkage accelerator pedal retrofit;

FIG. 4-8 is one example of a recommended retrofit for a horizontal lamp placement;

FIG. 4-9 is one example of a recommended production model lamp placement;

FIG. 4-10 is a typical speedometer including a 10 mph or less velocity sensor in accordance with this invention, together with a schematic diagram of one embodiment of a circuit suitable for use with such a speedometer;

FIG. 4-11 is an example of a two lamp early warning light of Module 1; and

FIG. 4-12 is a schematic diagram of an alternative embodiment of Module 1.

DETAILED DESCRIPTION
MODULE 1 - ACCELERATOR PEDAL PRESSURE SENSOR

Figures 2, 3, 4:
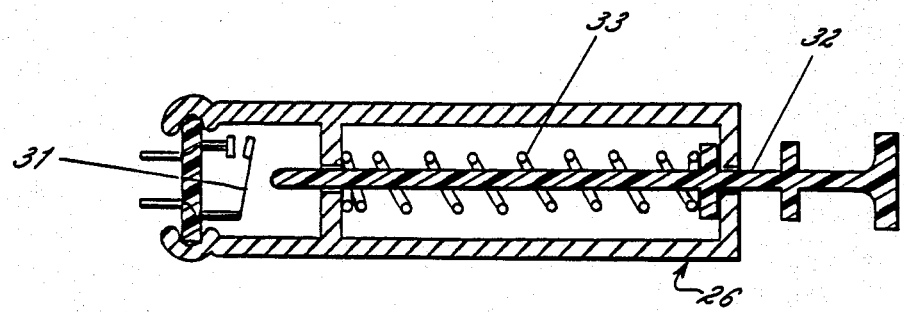
Figures 2, 3, 4, 5:
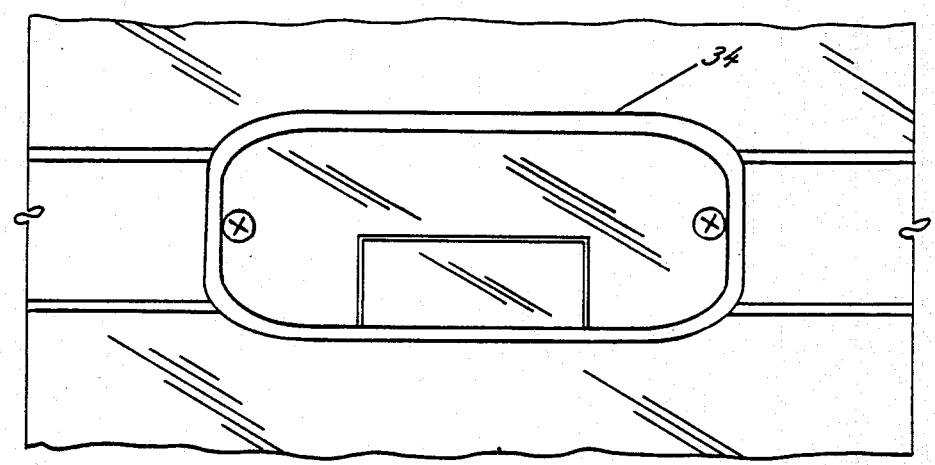
Figures 1, 3:
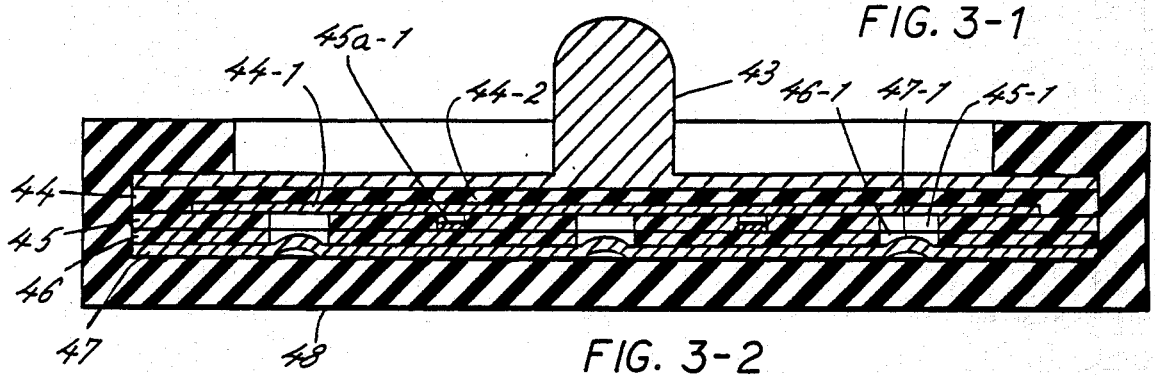
Figures 2, 3:
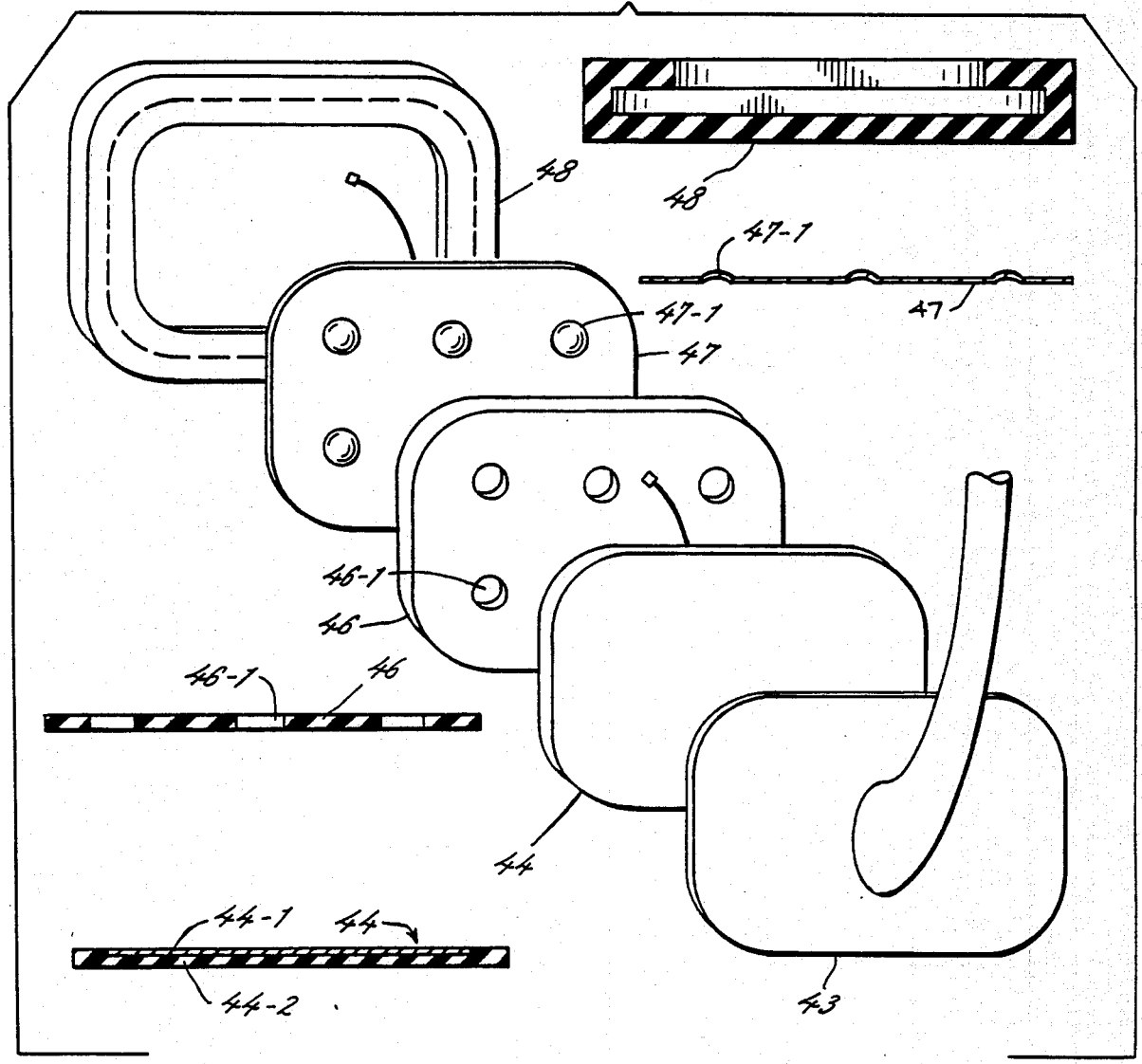
Figure 3:
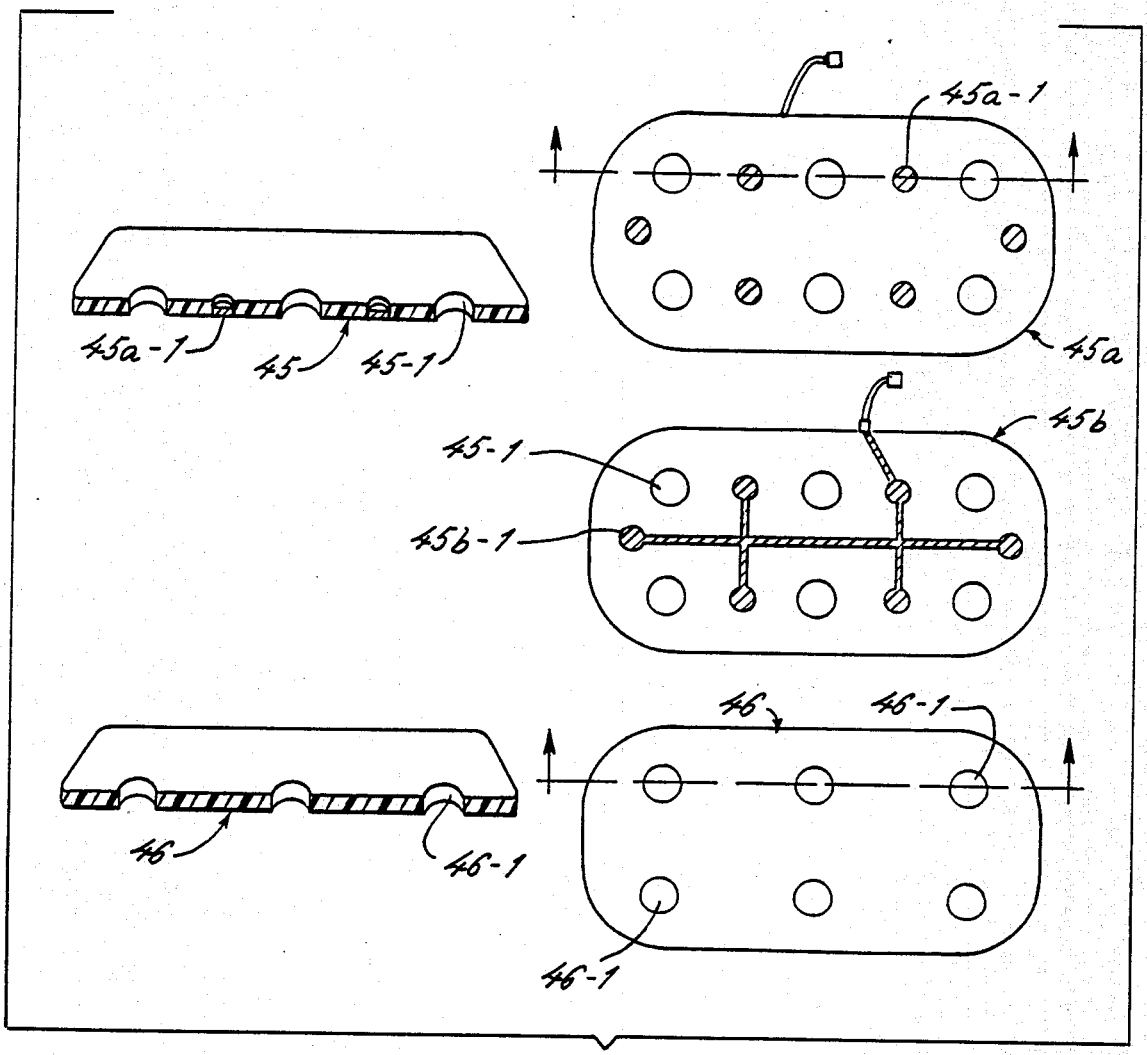
Figures 3, 4:
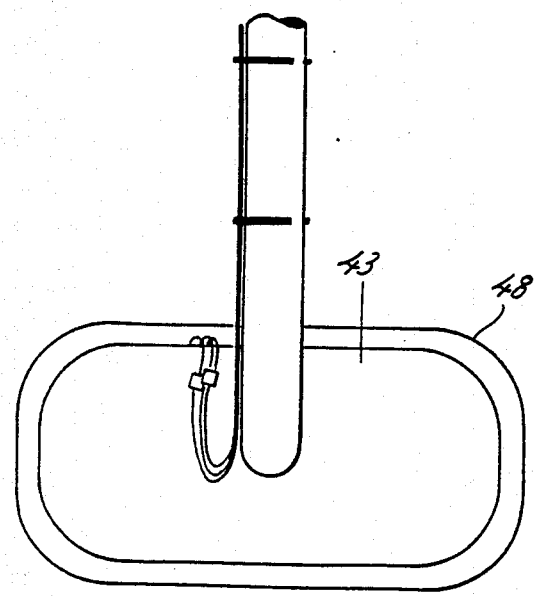
Figures 3, 4, 5:
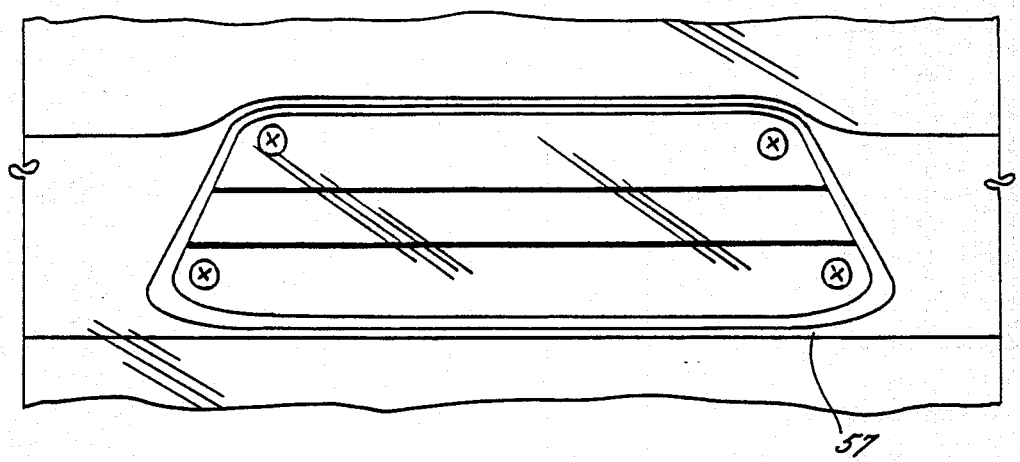
Figures 3, 4, 5, 6:
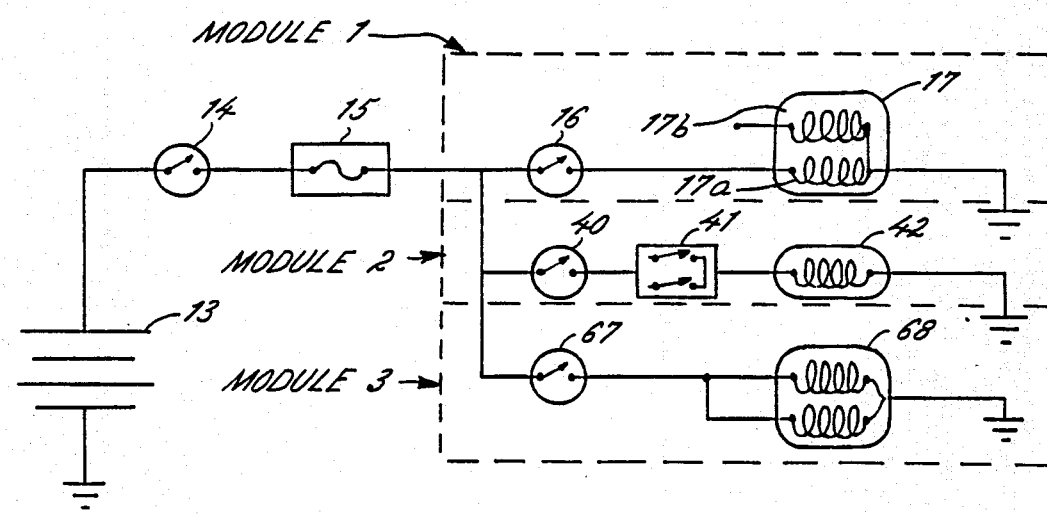
Figures 1, 4:
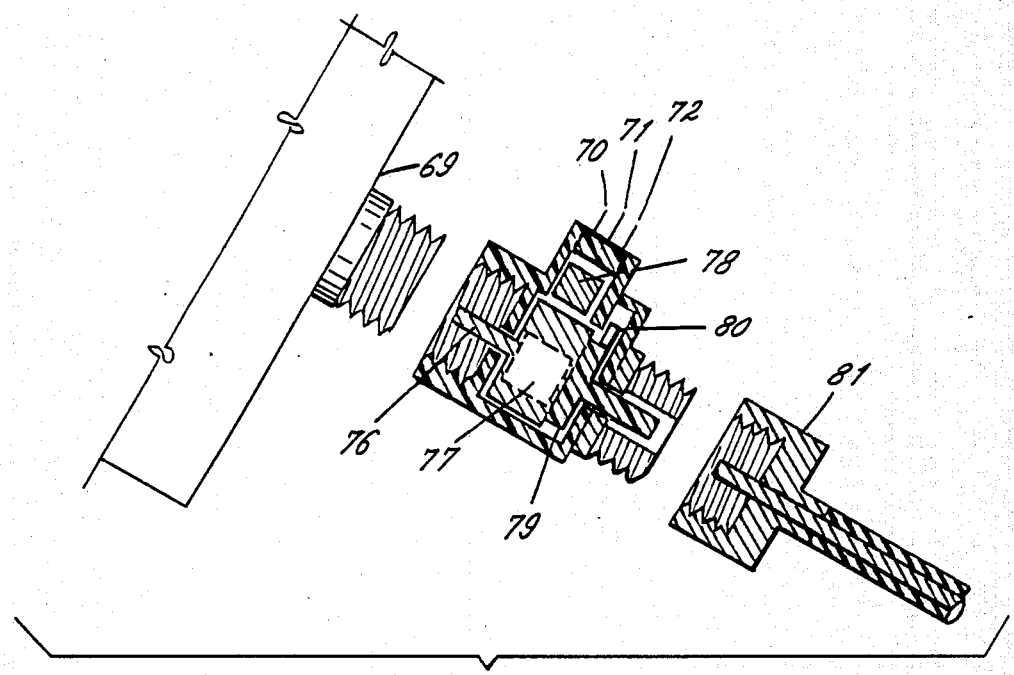
Figures 2, 4:
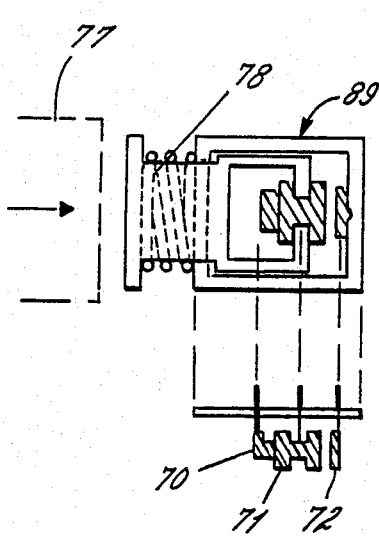
Figures 3, 4:
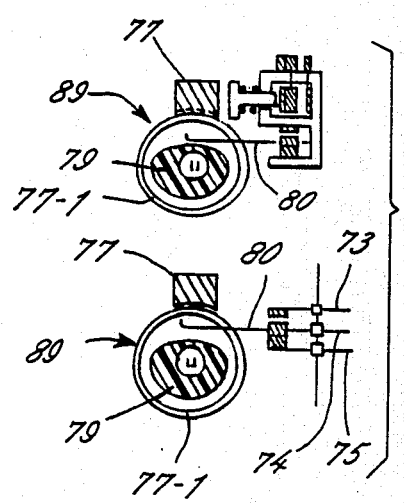
Figure 4:
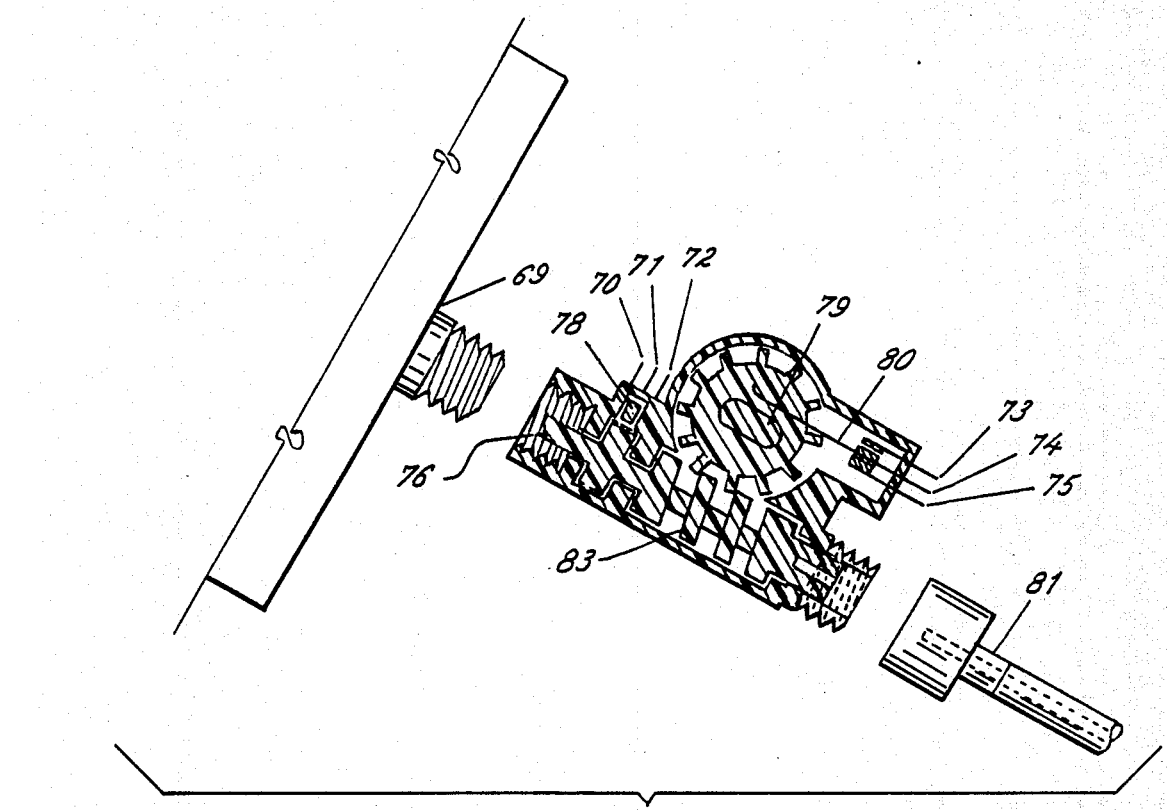
Figures 4, 5:
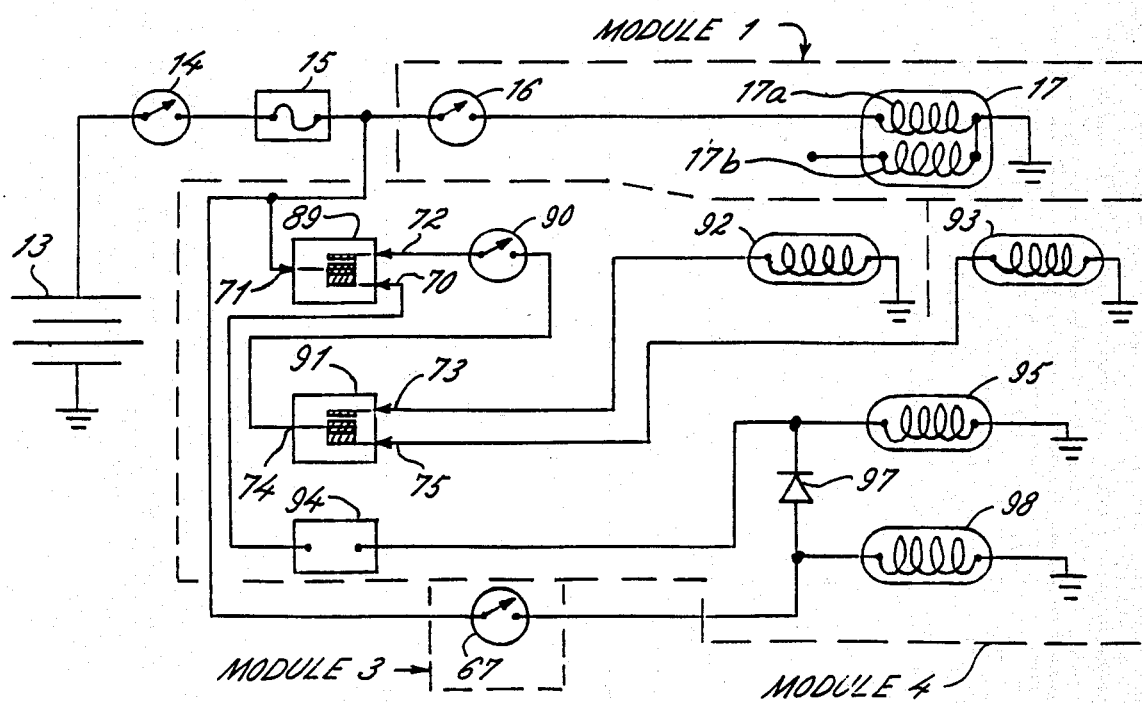
Figures 4, 5, 6:
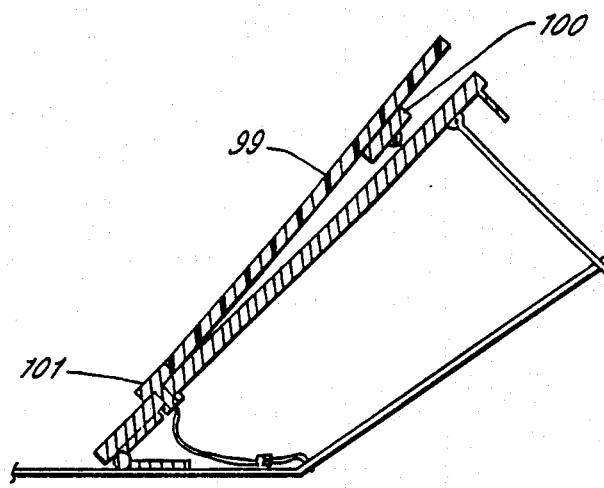
Figures 4, 5, 6, 7:
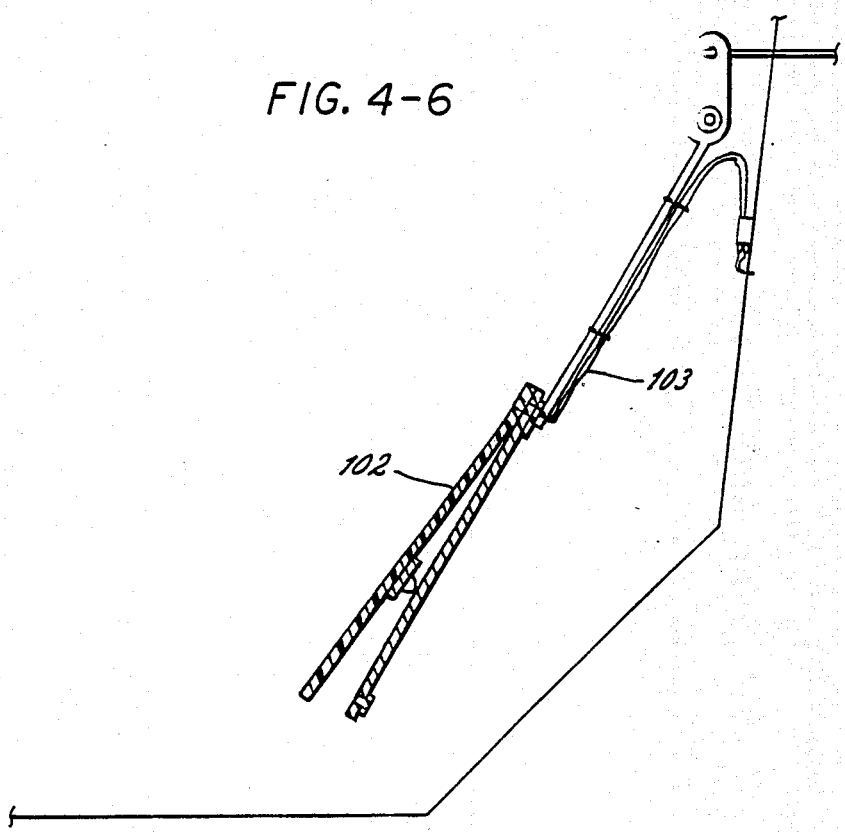
Figures 4, 5, 6, 7, 8:
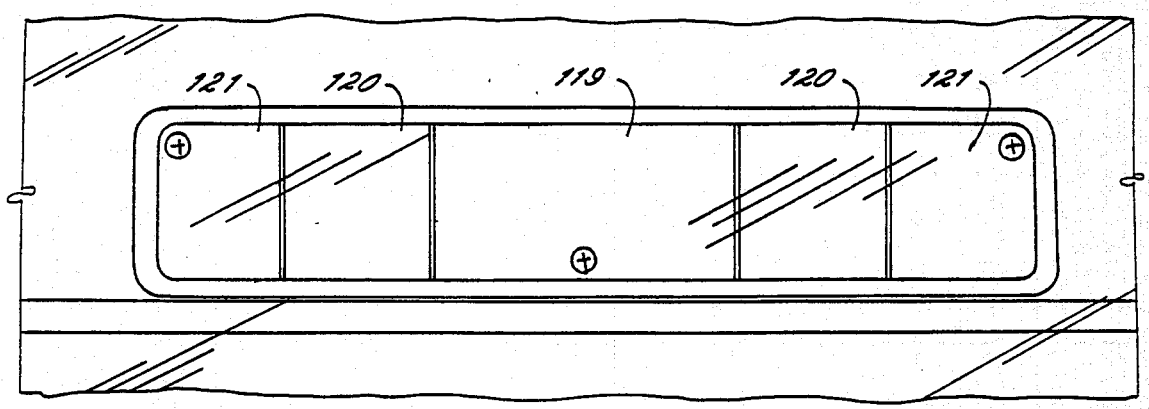
Figures 4, 5, 6, 7, 8, 9:
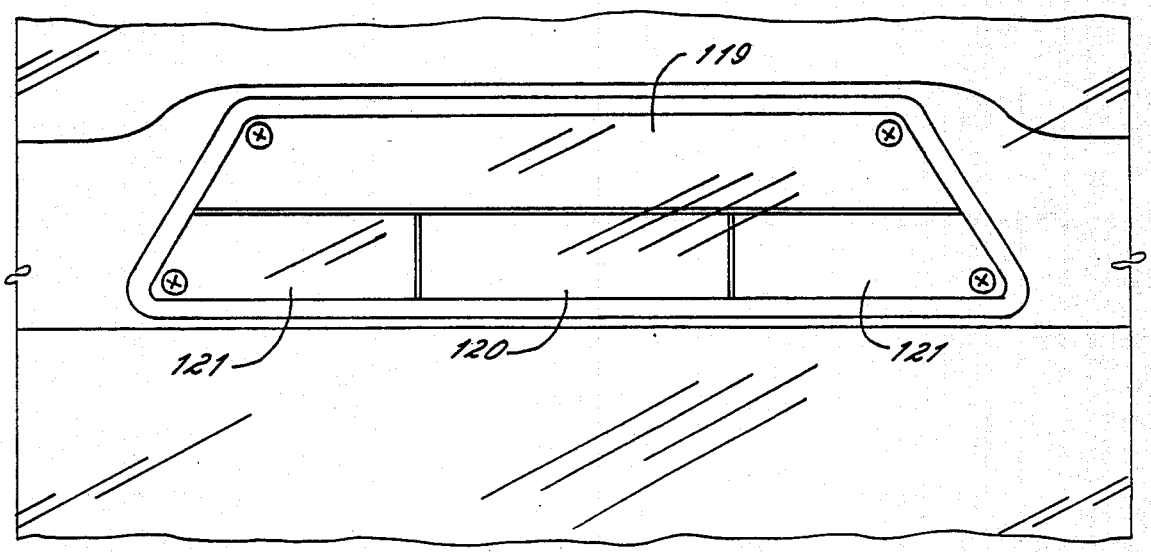
Figures 4, 5, 6, 7, 8, 9, 10:
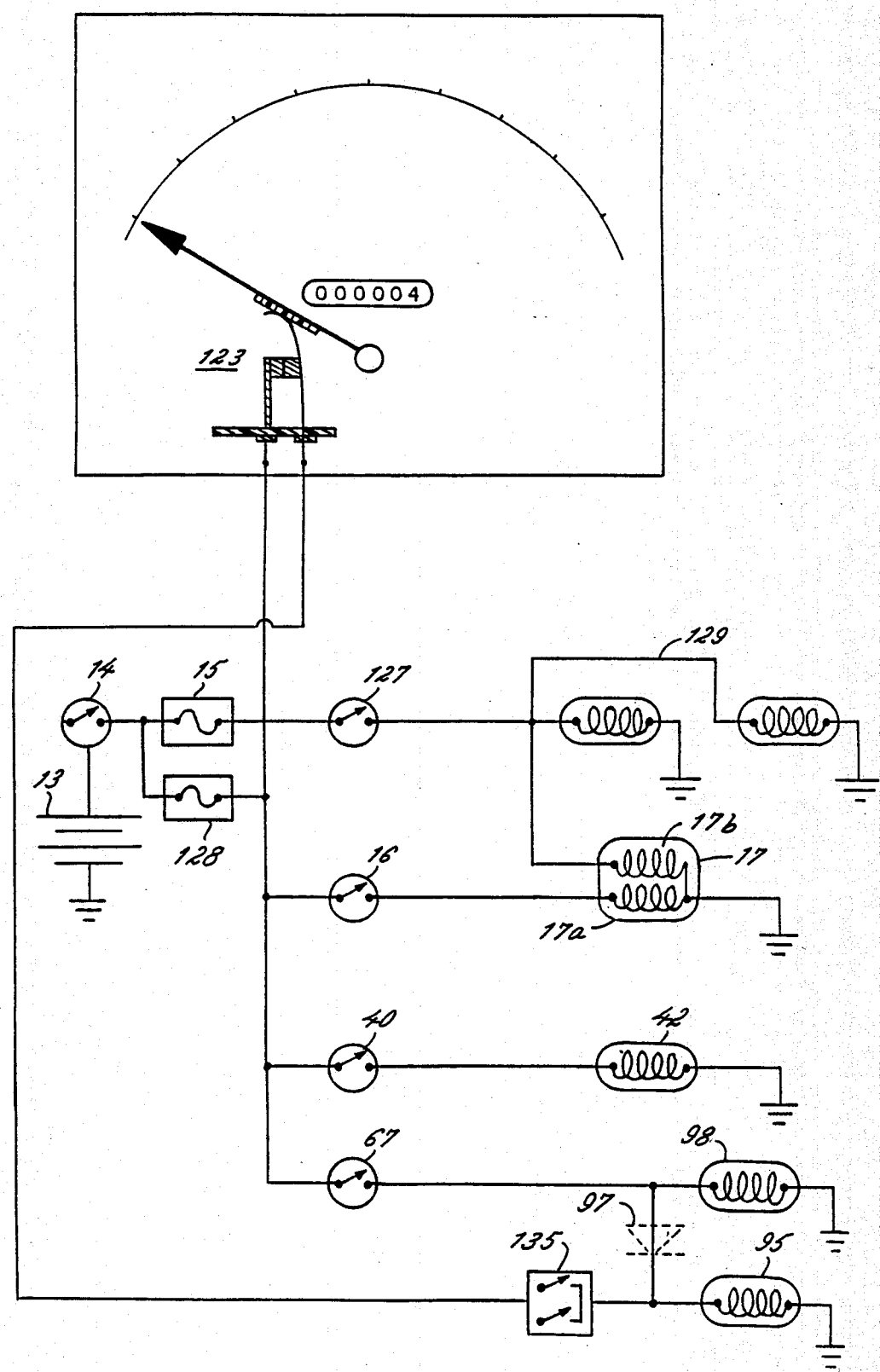
Figures 4, 5, 6, 7, 8, 9, 10, 11:
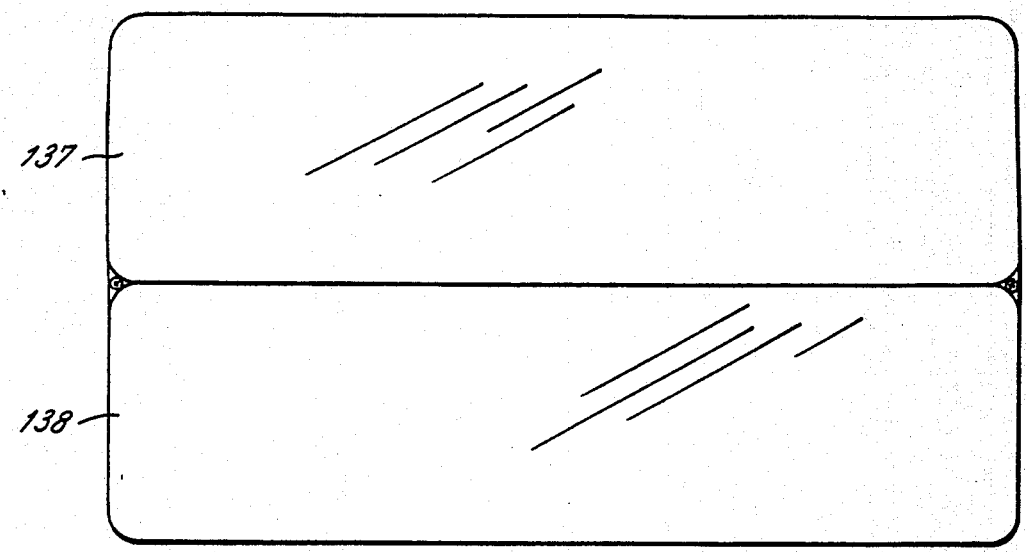
Figures 4, 5, 6, 7, 8, 9, 10, 11, 12:
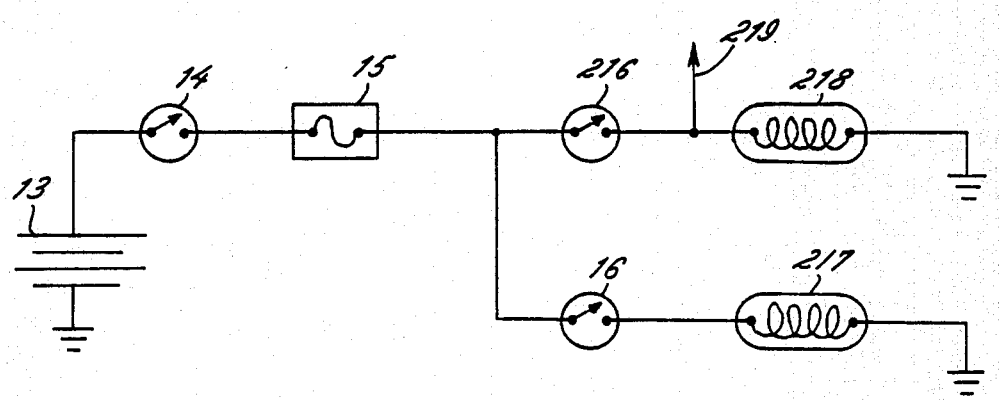

FIGS. 1—1 through 1-5 depict devices suitable for use in conjunction with one embodiment of an accelerator pedal pressure sensor constructed in accordance with the teachings of this invention. FIG. 1—1 shows a cutaway view of a reverse momentary electrical switch serving as an accelerator pedal pressure sensor. Electrical contact is made by removal of the driver's foot from the accelerator pedal: electrical contact is broken by application of the driver's foot to the accelerator pedal. The aforementioned operations turn off and on signal lamp 18 of FIG. 1-5, thereby giving to following drivers an early warning of braking.

Referring to FIG. 1—1, sensor 1 is a solid nylon sensor with tapered locking threads 6-1 to facilitate adjustment and replacement. Threads 6-1 allow adjustment to ensure proper clearance between breaker points 2a and pressure surface activation shaft 4. Tapered sensor threads 6-1 establish an effective moisture seal protecting breaker points 2 from corrosion. Molded into sensor 1 is a smooth circular groove 8-1 21 mm in diameter to accommodate the front lip of the bubble boot seal 8 protecting the electrical connection between sensor 1 and female plug 7.

Pressure sensor breaker points 2a are a normally closed set of contact breaker points. Electrical continuity is made and broken by the position of pressure surface activation shaft 4. In the resting position (driver's foot removed from the accelerator pedal), contacts 2a are closed. The application of the driver's foot to the accelerator pedal opens contacts 2a. The current rating of contact points 2a should be on the order of three times the continuous current load of light bulb filament 17a (FIG. 1-4) to ensure contact point longevity.

Referring again to FIG. 1—1, calibrated return spring 3 is, in this example, an eight turns-per-inch spring, calibrated at thirty grams of pressure at one centimeter of compression. In general, for any application, the pressure of return spring 3 must be great enough to overcome stiffness of boot 5 due to aging or cold weather. However, the pressure of return spring 3 must be less than enough to counter the fuel system accelerator pedal linkage return spring, in order to ensure that a minimum amount of pressure, such as simply resting the driver's foot on the accelerator pedal, will turn off signal lamp 18 of FIG. 1-5. Boot 5 is a flexible rubber boot which prevents debris and moisture from entering the switch.

Pressure surface housing 4-a provides a rectangular enclosure open at the bottom riding on return spring 3 and enclosing spring 3 and contact points 2. Non-conductive activation shaft 4 is attached at approximately the center of the inner top surface of pressure surface housing 4-a. Pressure surface housing 4-a moves up and down approximately 4 mm from stop to stop. Activation shaft 4 opens and closes pressure sensor breaker points 2 turning on and off signal lamp 18 of FIG. 1-5.

In one embodiment, braided copper flex wire is used to form cable 9 in order to accommodate the constant bending of wiring during normal automobile operation.

FIG. 1-2 shows a typical accelerator pedal 12 equipped with a pressure sensor assembly 5. Skid pad 11 is used to enhance traction with the driver's foot.

FIG. 1-3 shows more clearly the alignment of shaft 4 (perpendicular to the page) to contact bridging surface 2. Under normal operation, shaft 4 strikes the circular enlargement of the contact bridging surface dead center at 4b, causing contact points 2a to separate. The circular enlargement protects against shaft canter thereby preventing switch failure.

FIG. 1-4 shows a schematic diagram of a simple early warning system constructed using an accelerator pedal pressure sensor in accordance with the teachings of this invention. Electrical current flows from the positive terminal of battery 13 to ignition switch 14. With ignition switch 14 turned on, current flows through protective fuse 15 to accelerator pedal pressure sensor switch 16 provided by pressure sensor 1 of FIG. 1—1. Pressure switch 16 is closed with the driver's foot removed from the accelerator, causing current to flow to bulb 17 energizing filament 17a, thus lighting signal lamp 18 of FIG. 1-5. Filament 17b is energized by a wire (not shown) connected to the standard brake light circuitry, thereby allowing a third brake light, for example mounted in the rear window of a vehicle, to be illuminated in response to either the standard brake light system, or the early warning system of this Module 1. As seen from the schematic diagram of FIG. 1—4, the early warning light has no components in common with the standard brake lights. This independence makes the early warning system of this invention a foolproof back-up brake light system.

Signal lamp 18 of FIG. 1-5 is a red signal lamp indicating braking. Preferably, the signal lamp is located in the rear roof line of motor vehicles. Present third brake lights so located can be updated to the early warning lights of this invention by the installation of accelerator pedal switch 1 (FIG. 1—1) and the addition of two wires. One wire is a fused lead from the switched side of the ignition switch to one side of accelerator pedal switch 1. The second wire runs from the other side of accelerator pedal switch 1 to the positive terminal of the third brake lamp. When a single filament bulb is used as bulb 17 of FIG. 1-4, the existing wire on the positive terminal of the third brake light is fitted with a diode to prevent the lighting of stock brake lights by accelerator pedal switch 16. However, the dual filament arrangement offers an easy to understand signal pattern as well as offering electrical isolation between the stock brake light system and the early warning brake light.

MODULE 2: DECELERATION SENSOR

FIG. 2-1 is a pictorial illustration of one embodiment of a vacuum activated deceleration sensor 19. FIG. 2-3 shows a plunger switch deceleration sensor 26. Vacuum sensor 19 and plunger sensor 26, or other types of deceleration sensors are shown in the schematic diagram of FIG. 2-6 as switch 40. While any suitable type of deceleration sensor, including but not limited to vacuum sensor 19 and plunger sensor 26, can be used, any one vehicle need be equipped with only one deceleration sensor.

FIG. 2—2 shows a cut-away view of a vacuum activated deceleration sensor. Vacuum activated deceleration sensor breaker points 21 are a normally open set of breaker points which are opened and closed by diaphragm activation shaft 22, thereby turning off and on the amber deceleration signal bulb 42 of the dual lamp early warning light 34 of FIG. 2-5. Diaphragm activation shaft 22 is a guided non-conductive shaft secured to the back center of the seat of spring 24 which is located at the center of diaphragm 23. Shaft 22 moves horizontally in FIG. 2—2, opening and closing breaker points 21 as diaphragm 23 responds to engine intake manifold vacuum. Diaphragm return spring 24 is, for example, an eight turns-per-inch spring calibrated to begin compressing at ninety percent maximum intake manifold vacuum. Vacuum chamber outlet 25 provides vacuum hose linkage between the sensor's vacuum chamber and the engine's intake manifold or its equivalent.

FIG. 2-3 shows a typical carburetor application of a plunger switch deceleration sensor 26. This sensor arrangement adapts well to any motor vehicle fuel system. Simplicity and versatility make the plunger switch a preferred choice as a deceleration sensor.

FIG. 2-4 shows a cut-away view of a typical plunger switch deceleration sensor. Plunger switch deceleration sensor 26 is a sensor gauging accelerator linkage position. This design is universally adaptable to positive and negative manifold pressure fuel systems. As the throttle closes, the throttle valve lever 29 (FIG. 2-3) activates sensor 26 which turns on signal bulb 42 (FIG. 2-6) through optional flasher 41. This causes an amber signal to be displayed on the lower section of the dual lamp early warning light 34 of FIG. 2-5. Deceleration sensor breaker points 31 (FIG. 2-4) are opened and closed by activation shaft 32, making and breaking electrical continuity. Deceleration sensor activation shaft 32 is a non-conductive guided shaft fitted through return spring 33. Activation shaft return spring 33 is a low tension spring returning activation shaft 32 to its stop as the throttle is opened. This spring must not exert enough pressure to counter the accelerator linkage return spring (not shown) as this will prevent lever 29 (FIG. 2-3) from returning to its stop 28. Early warning light 34 (FIG. 2-5) is a two section signal lamp located optimally in the rear roof line of all motor vehicles. The top section contains a bulb 17 (FIGS. 1-5 and 2-6) whose first filament 17a provides a constant red signal triggered by accelerator pedal sensor 38 of Module 1 (FIG. 1—1), and whose second filament 17b is operated as a standard brake lamp. The bottom section of early warning light 34 contains a bulb 42 which provides an amber signal triggered by a deceleration sensor, such as vacuum sensor 19 or plunger sensor 26.

FIG. 2-6 is a schematic diagram of a two bulb, dual signal lamp, early warning light. Bulb 17 is the brake warning lamp contained in the top section of light 34 (FIG. 2-5), and operates as described above with regard to Module 1. Bulb 42 is the deceleration warning lamp contained in the bottom section of light 34. Electrical current flows from the positive terminal of battery 13 to ignition switch 14. With ignition switch 14 turned on, current flows through protective fuse 15 to sensor switches 16 and 40. When accelerator pressure switch 16 is closed, (driver's foot removed from the accelerator), current flows to bulb 17 energizing filament 17a, thus lighting the top section of the dual lamp early warning light 34. When deceleration sensor switch 40 is closed, (throttle lever 29 returned to its stop 28, FIG. 2-8), current flows to optional flasher 41 sending current to bulb 42, thereby energizing the amber bottom section of early warning lamp 34.

MODULE 3: BRAKE PEDAL SENSOR

FIG. 3-1 sows a cross-sectional view of one embodiment of low and high brake pressure sensors sandwiched together in the brake pedal's rubber skid pad. Low pressure sensor 45 serves as the stock brake light switch, and high pressure sensor 47 triggers the constant bright red signal displayed by the bottom lamp of signal light system 57 of FIG. 3-5. This bright red signal indication of heavy emergency braking alerts following drivers to an emergency ahead. Traditional brake switch designs give no indication of the magnitude of braking being encountered. Presently, vehicle operators must rely on their own wits and mental processes, using depth perception, to estimate the changing forward motion of the lead vehicle. Unfortunately, this is often inadequate to prevent accidents.

FIG. 3-2 is an exploded view of brake pedal high pressure sensor 47 of FIG. 3-1, but does not include the low pressure sensor 45 of FIG. 3-1. Section 44 includes a back surface 44-2 which is a generally rectangular, solid, non-conductive rubber surface fitted flush against brake pedal surface 43. The front surface of Section 44 includes rectangular metal conductive plate 44-1 which serves as the positive terminal of the pressure switch.

High brake pressure sensor compression pad 46 is a generally rectangular, non-conductive solid rubber pad provided with six circular holes 46-1 (aligned with the six circular holes 45-1 of section 45 when included) allowing high pressure sensor 47 to come in direct electrical contact with conductive surface 44-1. Dense rubber pad 46 compresses when heavy foot pressure is applied to the brake pedal and is designed to compress and allow current to flow from section 44 to section 47 on application of, for example, two-thirds the brake pedal pressure necessary to lockup the wheels of the particular vehicle to which the system is installed. Pad 46 may be fabricated in different thicknesses providing combinations of compressibility to accommodate any brake system design. If desired, inclusion of additional contacts (not shown) provides a variable brake pressure sensor capable of incrementing the brightness of a warning lamp proportional to the brake pressure being applied.

High brake pedal pressure sensor 47 is a generally rectangular contact plate fabricated from ordinary sheet metal. The raised lobes 47-1 face forward in the direction of contact plate 44-1 through the aligned holes in sections 45 and 46. Application of heavy brake pedal pressure compresses compression pad 46 allowing contact plates 44-1 and 47-1 to come into direct electrical contact allowing conventional current to flow from positive contact plate 44 to high pressure sensor contact plate 47. This action lights the bright constant red signal lamp located on the bottom section of the three lamp early warning light 57 of FIG. 3-5.

FIG. 3—3 shows an exploded view of section 45. Surface 45a, with six small recessed contacts 45a-1, faces conductive plate 44. Front surface 45b of section 45 includes conductive path 45b-1 formed, for example, of one sixty-fourth of an inch, spring steel. Paths 45b-1 electrically link the six recessed sensor contacts 45a-1.

Referring to FIG. 3—3, low pressure sensor 45 includes a generally rectangular compression pad 45 formed of dense, closed cell, neoprene rubber. Back surface 45b of pad 45 is fitted with metal conductive paths 45b-1. Under low brake pedal pressure, compression pad 45 compresses, causing sensor contacts 45a-1 to make contact with contact plate 44-1, thereby supplying current to the stock brake lights. This sensor replaces the stock brake light switch. Six circular holes 45-1 provide section 47 access to section 44. When included, section 45 is fitted between back surface 44 and compression pad 46, as shown in FIG. 3-1.

In one embodiment, sections 44 and 45 are eliminated, leaving a simple yet dependable ground switch arrangement. In this embodiment, upon application of heavy foot pressure to the brake pedal, compression pad 46 is compressed and contact plate 47 comes into direct electrical contact with the grounded metal surface of section 43. This action provides ground to both filaments of bulb 68 (FIG. 3-6) thus lighting the bottom section of the three lamp early warning light 57 of FIG. 3-5.

Brake pedal skid pad 48 (FIG. 3-1) provides traction enhancement between the surface of the driver's foot and the surface of the brake pedal. Skid pad 48 also acts as an enclosure for the brake pedal pressure sensor.

FIG. 3-4 is a rear view of the brake pedal and vertical brake lever showing wiring route.

FIG. 3-5 shows the three lamp four filament Early Warning light 57 located in the rear roof line of motor vehicles.

FIG. 3—6 is a schematic diagram of one embodiment of a three lamp, early warning light constructed in accordance with the teachings of this invention. Electrical current flows from the positive terminal of battery 13 to ignition switch 14. With ignition switch 14 turned on, current flows through protective fuse 15 to sensor switches 16, 40, and 67. When accelerator pedal pressure switch 16 is closed, (driver's foot removed from the accelerator), current flows to bulb 17 energizing filament 17a, thus lighting the top section of three lamp early warning light 57 (FIG. 3-5), as previously described above with regard to Module 1. Filament 17b is energized by the stock brake light system. When deceleration switch 40 is closed, (the throttle backed-off), current flows to optional flasher 41 sending current to bulb 42, thereby lighting the amber deceleration lamp located in the middle section of three lamp early warning light 57, as described above with regard to Module 2. When high brake pressure sensor switch 67 is closed, (heavy foot pressure applied to the brake pedal), current flows to both filaments of bulb 68, brightly lighting the bottom section of three lamp early earning light 57.

Any suitable means may be used for electrical connection to the brake pedal sensors of FIG. 3-1. For example, insulated electrical connectors linking ordinary stranded copper wire of a suitable gauge is sufficient. Three connections (battery voltage to conductive plate 44-1, stock brake lights to section 45, and sensor contact plate 47 to lamp 68) are necessary only for the most complex configuration shown in FIG. 3-1. The alternative configuration of FIG. 3-2 requires only two terminals (battery voltage to conductive plate 44-1 and sensor contact plate 47 to lamp 57) as low pressure sensor 45 is eliminated, rather than included to replace the stock brake light switch. Alternatively, the elimination of section 44 of FIG. 3-1 provides a two terminal ground switch (section 45 providing a ground connection to the stock brake lights and sensor contact plate 47 providing a ground connection to the high brake pressure lamp 68). The elimination of sections 44 and 45 yields a simple one terminal ground switch providing ground to bulb 68. This ground switch's economy and simplicity make it a good option.

MODULE 4: LOW VELOCITY SPEEDOMETER SENSOR

The three lamp early warning light is a rear roof-line mounted automotive signal system, displaying changes in a vehicle's forward motion to operators of following vehicles. The top lamp displays a constant red signal providing an early warning of braking (Module 1). The middle lamp displays an amber warning of deceleration (Module 2). The bottom lamp displays a bright red warning of heavy emergency braking (Module 3).

FIG. 4-1 depicts a mechanical motion sensor and a mechanical deceleration flasher, housed in one unit, for mounting in line with the speedometer cable between the transmission and the speedometer. Preferably the speedometer cable motion sensor is mounted at the transmission to eliminate reliance on the speedometer cable. Dual contact terminal 71 rides on throw arm 78 making and breaking continuity between contacts 71 to 70 and 71 to 72 in response to pressure from free riding magnet 77. Forward vehicle motion spins shaft 76 thus rotating the metal hoop 77-1 under magnet 77. Rotation of shaft 76 breaks contact between terminals 70 and 71 providing a red flashing indication of a stopped or stalled vehicle. As shaft 76 slows to a halt, return spring 78 (FIG. 4-2) returns throw arm 78 to its rest position, breaking connection between terminals 71 and 72, turning off the amber flashing deceleration indicator which is otherwise lit by Module 2. Drag switch 89 can be calibrated to cut out deceleration flasher 91 (FIG. 4-5) and turn on the automatic red flashing indicator of a stop, stalled, or slowly creeping vehicle.

Dual contacts of lever 80 (FIG. 4-3) distributes current alternately from terminal 74 to terminals 73 and 75, flashing decelerator bulbs 92 and 93 (FIG. 4-5). The flow of current to bulbs 92 and 93 is also dependent on continuity between terminals 71 and 72 of drag switch 89 and the state of decelerator switch 90.

Speedometer cable sensor shaft 76 (FIG. 4-1) is an in-line nylon shaft running the length of the deceleration sensor, and is driven by the speedometer drive shaft of a vehicle's transmission. Shaft 76 is fitted with end couplings as well as a metal hoop 77-1 riding under magnet 77. The sensor arrangement shown in FIG. 4-1 has a directly driven nylon eccentric cam 79, shown more clearly in FIG. 4-3. The embodiment of the sensor shown in FIG. 4—4 uses worm gear 83 to reduce the rotation rate of eccentric cam 79.

FIG. 4-4 shows a mechanical rotation sensor and a mechanical deceleration flasher housed in one unit, mounted preferably at the transmission or in line on the speedometer cable. This sensor utilizes a magnetic drag switch 89 as previously described with regard to FIG. 4-2, to cut out the amber deceleration indicator as a vehicle comes to a stop, in order to eliminate any confusion a deceleration light showing on a stopped or stalled vehicle may cause to approaching drivers. With this design, a stopped or slowly creeping vehicle shows only red lights. The second portion of this sensor uses in-line nylon worm gear 83 to gear down eccentric cam 79 thereby activating double contact lever 80 resulting in the alternate flashing of bulbs 92 and 93. This provides an easy means to flash the amber deceleration lights at the proper graduated rate. This configuration adapts well to any vehicle design and or any speedometer cable rotation rate. Gear ratio, and the number of eccentric cam lobes provided, allow a wide range of adaptability.

FIG. 4-5 is a schematic diagram of one embodiment of this invention. Current flows from battery 13 to ignition switch 14 through protective fuse 15 supplying current to drag switch 89. When drag switch 89 is in a resting position (vehicle stopped) current flows from terminal 71 to terminal 70 then flows to flasher 94 which emits pulses of current which flow to bulb 95. By replacing diode 97 with a direct connection, pulses of current flow from flasher 94 to both bulbs 95 and 98. As the vehicle begins to move, drag switch 89 breaks terminals 71 and 70 (turning off the stopped vehicle signal of lamp 95) and makes contact between terminals 71 and 72 allowing current to flow to deceleration switch 90. Upon closing of switch 90 current flows to terminal 74 of mechanical flasher 91 of FIG. 4—4 and is alternately distributed to terminals 73 and 75 at a rate determined by the vehicle's speed. These alternate pulses of current flow respectively from terminal 73 to bulb 92 and from terminal 75 to bulb 93, thereby alternately flashing dual amber lamps 120 of the Early Warning light of FIG. 4-8, or alternatively flashing the outboard bottom sections of the rear roof line Early Warning light 122 of FIG. 4-9.

As described above with regard to Module 3, current flows from fuse 15 to high brake pressure switch 67. When switch 67 is closed, current flows directly to bulb 98 and to bulb 95. Both bulbs 95 and 98 are energized, lighting the heavy emergency braking signal lamps 121 of the horizontal Early Warning light of FIG. 4-8, or lighting both outboard filaments of the bottom lamp of the roof line mounted Early Warning light 122 of FIG. 4-9. In this event, bulbs 95 and 98 serve a dual purpose: illumination as a result of operation of the low velocity speedometer sensor of Module 4, or as lamp 68 (FIG. 3-6) with regard to the brake pedal sensor of FIG. 3.

Figures 2, 3, 4, 5, 6:
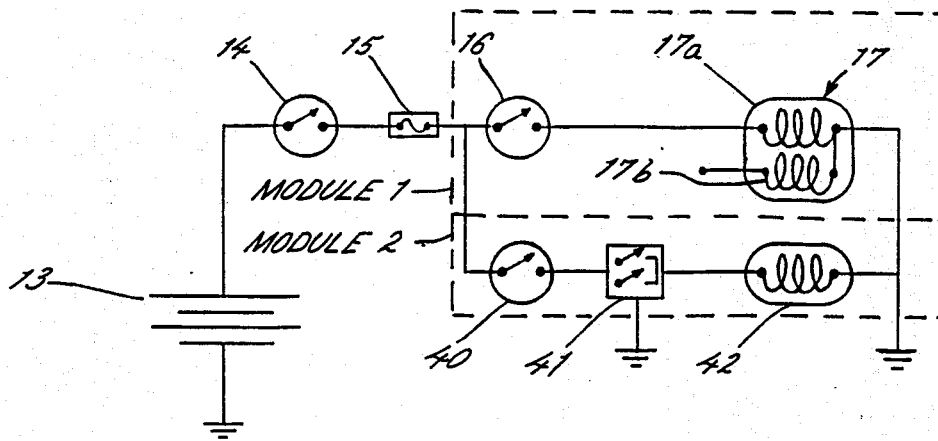

FIG. 4-6 is a side view of the floor board linkage accelerator pedal retrofit, allowing existing accelerator pedals to be retrofit with an accelerator pedal switch, as previously described with regard to module 1. As shown in FIG. 4-6, a standard accelerator pedal is fitted with a hinge 101, connecting a skid pad 99 upon which is placed the driver's foot. Mounted on skid pad 99 is accelerator pressure sensor 100.

FIG. 4-7 is a side view of the fire wall mounted linkage accelerator pedal retrofit, along the lines of the structure of 4-7, for those accelerator pedals which are connected to the accelerator linkage at their top.

FIG. 4-8 shows a rear window, horizontally mounted, Early Warning light. The bottom of the rear window provides a safe, convenient, and reasonably visible location. FIG. 4-9 shows a rear roof line mounted Early Warning light. This location affords following drivers the best possible visual contact with the Early Warning light. Visibility is an important point as the Early Warning system's greatest contribution to safety may be the contouring of dense high speed freeway traffic. The early warning lights of FIGS. 4-8 and 4-9 include portion 119 which provides an amber signal to following drivers in response to the accelerator pedal pressure sensor of module 1. Portions 120 provide an amber flashing low speed signal, which flashes at a rate determined by the vehicle speed. Portions 121 provide an indication of heavy emergency braking, as detected by high pressure applied to the brake pedal.

FIG. 4-10 and a schematic diagram utilizing a speedometer equipped with a low vehicle velocity sensor. Alternatively, a simplified speedometer cable switch could be used here in order to eliminate everything except drag switch 89 and contacts 70 and 71 shown in FIG. 4-2. An alternative embodiment (not shown) a reed switch is used to bias a transistor network for use as a low velocity sensor.

There are no component boards or decision circuits, only switches wired directly to warning lamps. The lead driver's intensions are signaled back to the following driver's advantage. Low velocity sensor 123 energizes filament 95 through flasher 135. This causes the red lower section of lamp 57 (FIG. 3-5) to be lit. Brake switch 127 energizes the standard brake lights 129 as well as filament 17b of lamp 17, thereby lighting the red top section of lamp 57 of FIG. 3-5. Accelerator pedal pressure switch 16 energizes filament 17a of bulb 17, lighting the top red section of lamp 57 of FIG. 3-5. Deceleration switch 40 (Module 2) energizes bulb 42, lighting the amber middle section of lamp 57 of FIG. 3-5. High brake pressure switch 67 (Module 3) energizes both lamps 95 and 98, brightly lighting the red bottom section of lamp 57 of FIG. 3-5.

FIG. 4-11 shows one embodiment of a two lamp Early Warning light. This simple configuration is suitable for use in conjunction with the schematic diagram shown in FIG. 4-12.

FIG. 4-12 is a schematic diagram of an alternative embodiment of a two lamp Early Warning light system. This configuration offers significant protection from rear-end collisions as well as offering uncomplicated reliability. This embodiment is an alternative embodiment of Module 1 described above. In the schematic diagram of FIG. 4-12, current flows from battery 13 through ignition switch 14 and fuse 15 to both accelerator pedal pressure switch 16 and standard brake light switch 216. Standard brake light switch 216 lead 219 makes current available to the standard brake lights. Brake light switch 216 also causes bulb 218 to be energized when the brake pedal is pressed, thereby lighting the red top section 137 of the third brake light of FIG. 4-11. Upon removal of the driver's foot from the accelerator pedal, accelerator pedal pressure switch 16 closes, thereby energizing bulb 217, which in turn lights the bottom, amber section 138 of a third brake light depicted in FIG. 4-11.

All publications and patent applications are herein incorporated by reference to the same extent as if each individual publication or patent application was specifically and individually indicated to be incorporated by reference. The invention now being fully described, it will be apparent to one of ordinary skill in the art that many changes and modifications can be made thereto without departing from the spirit or scope of the appended claims.

What is claimed is:

1. A vehicle brake light system comprising:
   a brake pedal means for receiving the foot of a driver in order to receive the control of said driver in an attempt to cause said vehicle to brake, and transferring said control to the braking system of said vehicle;
   a first switch means integrally formed within said brake pedal means for detecting application to said brake pedal means of said control of said driver of a pressure of at least a first magnitude in an attempt by said driver to cause braking, regardless of whether said control is actually transferred to said braking system of said vehicle, and regardless of whether braking actually occurs in response to said control;
   first indicator means responsive to said first switch means for providing a first indication of said control of said driver of a pressure of at least a first magnitude to said brake pedal means;
   second switch means integrally formed within said brake pedal means for detecting application to said brake pedal means of said control of said driver of a pressure of at least a second magnitude greater than said first magnitude, in an attempt by said driver to cause heavy braking, regardless of whether said control is actually transferred to said braking system of said vehicle, and regardless of whether braking actually occurs in response to said control; and second indicator means, independent of said first indicator means, responsive to said second switch means for providing a second indication of said control of a second magnitude to said brake pedal means.

2. A vehicle brake light system as in claim 1 wherein said first switch means serves to detect the placement of said driver's foot on said brake pedal means.

3. A vehicle brake light system as in claim 1 wherein said second indicator means provides said second indication for substantially the entire period of application to said brake pedal means of said control of said driver of a pressure of at least said second magnitude.

4. A vehicle brake light system as in claim 1 wherein said second switch means is responsive to pressure applied to said brake pedal means which is approximately equal to 2/3 of the pressure required to be applied to said brake pedal means in order to provide maximum braking effort.

5. A vehicle brake light system as in claim 1 wherein said second indicator means provides an indication proportional to the pressure applied to said brake pedal means.

6. A vehicle warning light system for providing an indication of possible imminent braking to enhance the reaction time of following drivers comprising:

an accelerator pedal for controlling vehicle speed;

switch means integrally formed with said accelerator pedal for detecting the presence or absence of a driver's foot on said accelerator pedal without regard to the position of said accelerator pedal;

brake indicator means for indicating vehicle braking; and an advanced brake warning indicator means responsive to said switch means for providing an indication of possible imminent braking, independent of said indication of vehicle braking, in response to the absence of said driver's foot on said accelerator pedal, said indication being provided for substantially the entire period of said absence of said driver's foot from said accelerator pedal.

* * * * *